US011693799B2

(12) United States Patent
Butenhof et al.

(10) Patent No.: US 11,693,799 B2
(45) Date of Patent: Jul. 4, 2023

(54) BANDWIDTH CONTROL FOR INPUT/OUTPUT CHANNELS

(71) Applicant: RED HAT, INC., Raleigh, NC (US)

(72) Inventors: David Butenhof, Westford, MA (US); Lennart Poettering, Brasbrunn (DE); Peter Portante, Westford, MA (US); W Webb Scales, Concord, MA (US)

(73) Assignee: RED HAT, INC., Raleigh, NC (US)

( * ) Notice: Subject to any disclaimer, the term of this patent is extended or adjusted under 35 U.S.C. 154(b) by 29 days.

(21) Appl. No.: 17/479,992

(22) Filed: Sep. 20, 2021

(65) Prior Publication Data

US 2023/0086172 A1 Mar. 23, 2023

(51) Int. Cl.
*G06F 13/22* (2006.01)
*G06F 13/10* (2006.01)
*G06F 13/16* (2006.01)

(52) U.S. Cl.
CPC .......... *G06F 13/225* (2013.01); *G06F 13/102* (2013.01); *G06F 13/1605* (2013.01)

(58) Field of Classification Search
CPC .. G06F 13/102; G06F 13/1605; G06F 13/225; H04L 47/10; H04L 47/70
USPC ...................................................... 710/29, 44
See application file for complete search history.

(56) References Cited

U.S. PATENT DOCUMENTS

| 6,826,640 | B1 * | 11/2004 | Chang | G06F 13/362 |
| | | | | 710/240 |
| 7,577,780 | B2 * | 8/2009 | Huang | G06F 13/362 |
| | | | | 710/243 |
| 8,040,807 | B2 * | 10/2011 | Pai | H04L 47/41 |
| | | | | 370/236 |
| 9,729,634 | B2 | 8/2017 | Adriaens et al. | |
| 10,001,827 | B2 * | 6/2018 | Woo | G06F 11/3027 |
| 10,671,458 | B2 | 6/2020 | Pope et al. | |
| 11,074,202 | B1 * | 7/2021 | Tsirkin | G06F 13/1668 |
| 11,269,792 | B2 * | 3/2022 | Martin | G06F 11/2015 |
| 2014/0112131 | A1 * | 4/2014 | Todaka | H04L 47/2433 |
| | | | | 370/230 |

(Continued)

FOREIGN PATENT DOCUMENTS

CN 111917586 11/2020

OTHER PUBLICATIONS

Github, "Provide Logging Behavior Policies Applied by conmon to stdout/stderr", available on the internet at https://github.com/containers/common/issues/84, Nov. 14, 2019, 1 page.

(Continued)

*Primary Examiner* — Brian T Misiura
(74) *Attorney, Agent, or Firm* — Kilpatrick Townsend & Stockton LLP

(57) ABSTRACT

Bandwidth control can be provided for input/output channels according to some aspects described herein. In one example, a system can detect an input/output (I/O) request transmitted by a software application. In response to detecting the I/O request, the system can determine a bandwidth group that corresponds to an I/O channel associated with the I/O request. The system can then determine whether bandwidth consumption of the bandwidth group exceeds a predefined bandwidth limit. If so, the system can execute a predefined policy assigned to the I/O channel for handling the I/O request.

20 Claims, 8 Drawing Sheets

(56) References Cited

U.S. PATENT DOCUMENTS

2017/0199770 A1* 7/2017 Peteva .................. G06F 9/5088
2019/0052532 A1* 2/2019 Chen .................... H04L 47/781

OTHER PUBLICATIONS

Heo, "C Group Admin Guide", available on the internet at https://www.kernel.org/doc/html/latest/admin-guide/cgroup-v2.html#io, Oct. 2015, 4 pages.
Kernel, "Block ID Controller", available on the internet at https://www.kernel.org/doc/Documentation/cgroup-v1/blkio-controller.txt, at least as early as Jul. 1, 2021, 4 pages.
Nelson, "Tuning NGINX for Performance", Oct. 10, 2014, 4 pages.
Wikipedia, "C Groups", available on the internet at https://en.wikipedia.org/wiki/Cgroups , 2007, 1 page.

* cited by examiner

112

| Bandwidth Group | Bandwidth Limit (megabytes/second) |
|---|---|
| 1 | 100 MB/s |
| 2 | 200 MB/s |
| 3 | 150 MB/s |
| 4 | 1 MB/s |
| 5 | 50 MB/s |
| 6 | 100 MB/s |

FIG. 3

BANDWIDTH CONTROL FOR INPUT/OUTPUT CHANNELS

TECHNICAL FIELD

The present disclosure relates generally to controlling bandwidth consumption in computing systems. More specifically, but not by way of limitation, this disclosure relates to controlling bandwidth consumption associated with input/output (I/O) channels.

BACKGROUND

Software applications can transmit input/output (I/O) requests to various destinations, such as physical disks, virtual disks, network devices, and other processes. The I/O requests can be transmitted via I/O channels. Examples of the I/O requests can include read requests for reading data and write requests for writing data. Transmitting the I/O requests and associated data across the I/O channels can consume the bandwidth of the I/O channels. Because there is a limited amount of available bandwidth in any given set of I/O channels, software applications transmitting I/O requests over the I/O channels may compete for available bandwidth.

BRIEF DESCRIPTION OF THE DRAWINGS

FIG. 3 is a table of an example of a bandwidth limit mapping according to some aspects of the present disclosure.

DETAILED DESCRIPTION

Figure 1:
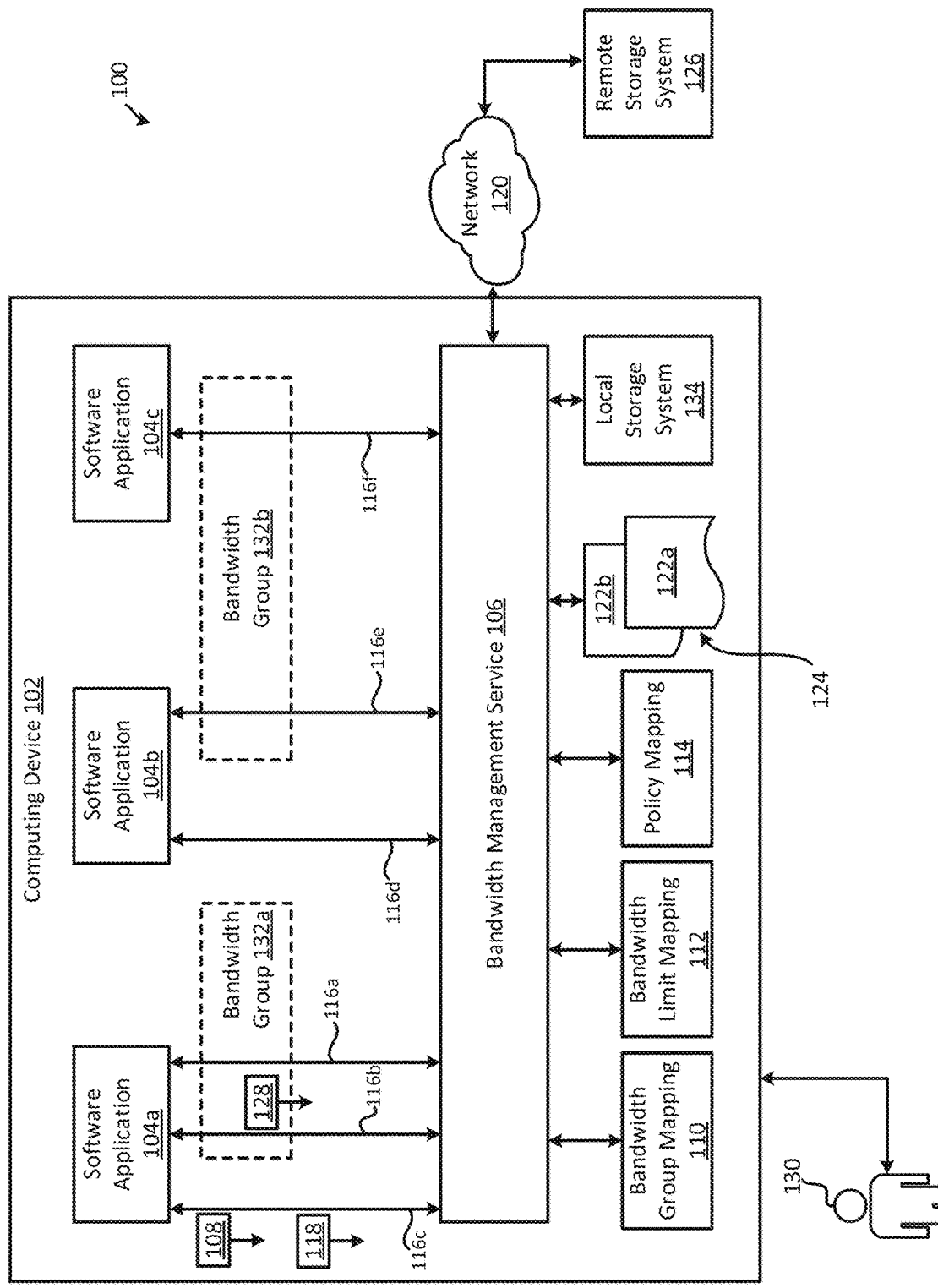
FIG. 1 is a block diagram of an example of a system for controlling bandwidth consumption according to some aspects of the present disclosure.

Software applications on a computing device can transmit input/output (I/O) requests to a destination, which may be local or remote to the computing device. Examples of the destination can include physical disks, virtual disks, network devices, and other processes. The software applications can transmit the I/O requests via I/O channels on the computing device. An I/O channel can be a means for allowing a software application to make a request to a device driver to communicate with a destination. An example of the device driver can be a storage driver for interfacing with a storage device. I/O channels may be conceptualized as an ephemeral virtual pathway from a software application to a destination. The software applications may transmit certain types of requests via one I/O channel and other types of requests via another I/O channel. For example, a first software application may transmit write requests for storing debugging data (e.g., log data) to a destination via a first I/O channel and a second software application may transmit write requests for storing application data to the destination via a second I/O channel. But there is a finite amount of total available bandwidth across all I/O channels for a given destination. If a software application consumes a significant amount of the total available bandwidth for a particular destination by transmitting I/O requests on one I/O channel, it may prevent other software applications from transmitting I/O requests to the destination on the other I/O channels. Lack of available bandwidth on the other I/O channels may lead to delayed or incomplete I/O requests, which can reduce performance of the other software applications. For example, if a software application consumes all of the available bandwidth for the destination in transmitting debugging data over a given I/O channel, it may prevent other software applications on the computing device from being able to write data to the destination when performing other processes. This can lead to errors and reduced performance of the other software applications.

Some examples of the present disclosure can overcome one or more of the abovementioned problems via a bandwidth management service that can group I/O channels together into a bandwidth group (e.g., a pool of I/O channels), assign an overall bandwidth limit to the bandwidth group, and manage I/O requests transmitted via the I/O channels in the bandwidth group to help ensure that the overall bandwidth limit for the bandwidth group is respected. The I/O requests can be managed using individual I/O control policies assigned to the I/O channels in the bandwidth group. Different I/O channels within a given bandwidth group may be assigned the same I/O control policies or different I/O control policies for handling corresponding I/O requests in different ways. This may allow for a high degree of granularity and flexibility in customizing how bandwidth is controlled for a given bandwidth group. Using these techniques, bandwidth consumption can be better apportioned among competing computing operations, which can reduce contention for bandwidth and improve performance of the software applications. In some examples, the bandwidth management service can be configured to perform its functionality as far upstream as possible during the I/O request process. This may reduce the number of times that the same data is transferred (e.g., copied) among system components during the I/O request process, thereby reducing consumption of system resources.

In some examples, the bandwidth management service can be executed in a manner that is hidden from the software application or software applications transmitting the I/O requests. As a result, the software applications may be unaware that the bandwidth management service is throttling or otherwise influencing their I/O requests. This may be achieved in some examples through the usage of a hook (e.g., an event hook inserted at runtime or at another point in time), which may be automatically triggered in response to an I/O request from a software application. The hook may call the bandwidth management service, which may execute some or all of the functionality described herein. For example, the bandwidth management service can determine the I/O channel corresponding to the I/O request, the I/O policy assigned to the I/O channel, and execute a corresponding control operation based on the I/O policy.

Examples of the control operation can include marking the I/O request as complete, delaying the I/O request for a time period, dropping the I/O request, allowing the I/O request to proceed as normal, etc. Using these or other techniques described herein, the system can use the bandwidth management service to control bandwidth consumption unbeknownst to the software applications transmitting the I/O requests, for example without the program code for the software applications needing to be modified.

As mentioned above, in some examples the bandwidth management service can perform its functionality as far upstream as possible during the process by which an I/O request is transmitted to a destination. This may reduce the number of times that the same data is transferred (e.g., copied) among system components to effectuate the I/O request, thereby reducing consumption of system resources. More specifically, the transmission of data through the I/O channel consumes system resources such as CPU, physical memory, bus bandwidth, and possibly disk/network traffic outside the computer. Placing the bandwidth management service closer to where the I/O request originates can reduce or eliminate some or all of this resource consumption. For example, a typical process by which a software application writes a dataset to a destination may involve the software application first writing the dataset to a buffer in application memory. Application memory can be a specific portion of memory, such as random access memory, assigned to the software application. The software application then requests that the dataset be written out to the destination by transmitting a write request to the operating system. The operating system can receive the write request and respond to the write request by copying the dataset from application memory to system memory, which can be another portion of memory assigned to the operating system. The dataset may then be transferred to the device driver and potentially to other areas of the system, before ultimately being written to the destination. Transferring the same dataset multiple times throughout this process can consume valuable system resources. But in some examples, the bandwidth management service may be called (e.g., using an event hook) at an upstream point in the I/O process, for example before the dataset is transferred from application memory to system memory. This can allow the bandwidth management service to perform its control operations in a timely manner, for example before the dataset leaves the application memory or the transaction reaches the kernel, potentially preventing downstream operations from occurring and thereby reducing consumption of system resources.

As one example of the present disclosure, a software application can transmit an I/O request via an I/O channel. Transmitting the I/O request may trigger an event hook, which can call the bandwidth management service. The bandwidth management service can detect the I/O request and determine a bandwidth group that contains the I/O channel. The bandwidth management service can next determine a bandwidth limit assigned to the bandwidth group and determine bandwidth consumption of the bandwidth group. If the bandwidth consumption of the bandwidth group is below the bandwidth limit, the bandwidth management service can allow the I/O request to be transmitted across the I/O channel as normal. On the other hand, if the bandwidth consumption of the bandwidth group meets or exceeds the bandwidth limit, the bandwidth management service can determine and execute a predefined I/O control policy assigned to the I/O channel. Different I/O channels can be assigned different I/O control policies, where the predefined I/O control policies include instructions about how to handle the I/O request. For example, an I/O control policy may indicate that an I/O request is to be entirely discarded or delayed in its transmission, so that the bandwidth limit of the corresponding bandwidth group is respected. In this way, the bandwidth management service can manage the bandwidth consumption by the various bandwidth groups to help ensure that the corresponding bandwidth limits are respected.

In some examples, the bandwidth groups and the bandwidth limits can be selected by a system administrator. This can allow the system administrator to customize how bandwidth is consumed on the I/O channels according to their preferences or needs. In some examples, the I/O control policies for the I/O channels may be set by the software applications, a framework configured to deploy the software applications, or by another entity. For example, a framework such as a container orchestrator can notify the bandwidth management service of which predefined I/O control policies to execute in relation to different I/O channels. Since it may be desirable for the bandwidth management service to handle I/O requests associated with different I/O channels in different ways when bandwidth limits are reached, this approach may allow request handling to be customized for the I/O channel.

These illustrative examples are provided to introduce the reader to the general subject matter discussed here and are not intended to limit the scope of the disclosed concepts. The following sections describe various additional features and examples with reference to the drawings in which similar numerals indicate similar elements but, like the illustrative examples, should not be used to limit the present disclosure.

FIG. 1 is a block diagram of an example of a system 100 for controlling bandwidth consumption according to some aspects of the present disclosure. The system 100 includes a computing device 102, such as desktop computer, laptop computer, server, or mobile phone. In some examples, the computing device 102 may be a node of a distributed computing environment, such as a cloud computing environment, a computing cluster, or a data grid.

The computing device 102 can execute one or more software applications, such as software applications 104*a-c*. Examples of a software application can include a utility application, game, word processor, load balancer, etc. The software applications 104*a-c* may be monolithic applications, microservices, serverless functions, etc. In some examples in which the computing device 102 is a user device, the software applications 104*a-c* may be frontend applications or services. Alternatively, the software applications 104*a-c* may be backend applications or services, for example if the computing device 102 is a server.

As the software applications 104*a-c* execute, they can transmit I/O requests to receive inputs or provide outputs via one or more I/O channels. One example of an I/O request can be a read request for reading data from a source, such as a local storage system 134 or a remote storage system 126. Another example of an I/O request can be a write request for writing data to a destination, such as the local storage system 134 or the remote storage system 126. Each I/O channel may be configured for communicating read requests, write requests, or both.

The I/O channels can be established by any suitable entity, such as a software framework configured to deploy the software applications 104*a-c*. One example of such a software framework may be a container orchestrator and one example of the software applications 104*a-c* may be processes deployed within containers (e.g., relatively isolated virtual environments) by the container orchestrator. The I/O channels can be established before, during, or after a startup phase of the software applications 104a-c. Once the one or more I/O channels are established, the software applications 104-c can transmit I/O requests via those I/O channels.

In the example shown in FIG. 1, the software application 104a is configured to communicate I/O requests over I/O channels 116a-c. Additionally, the software application 104b is configured to communicate I/O requests over I/O channels 116d-e. Further, the software application 104c is configured to communicate I/O requests over I/O channels 116f. While none of the software applications 104a-c share a common (e.g., the same) I/O channel in this example, other examples may involve two or more software applications 104a-c sharing the same I/O channel. For instance, software applications 104a-b may both be configured to communicate I/O requests over I/O channel 116a in another example.

Some or all of the I/O channels 116a-f may be assigned to bandwidth groups. A bandwidth group is a pool of I/O channels that are collectively monitored for determining whether their collective bandwidth consumption meets or exceeds a predefined bandwidth limit. Any number and combination of I/O channels, including one, may be assigned to a particular bandwidth group. For example, I/O channels 116a-b can be assigned to bandwidth group 132a and I/O channels 116e-f can be assigned to bandwidth group 132b. The I/O channels assigned to a particular bandwidth group may all belong to the same software application 104a or they may belong to different software applications 104b-c. A user 130, such as a system administrator, or a software framework can assign I/O channels to bandwidth groups as desired.

In some examples, the I/O channels 116a-f can be grouped together based on their priority levels, for example so that I/O channels of a similar priority level may be pooled into the same bandwidth group. In some examples, the priority level of an I/O channel may depend on the importance of the computing operations associated with the I/O channel. For example, storing log data to disk may be of lower priority than storing application data to disk, so I/O channels used to store log data may have a lower priority than I/O channels used to store application data. Once the I/O channels are grouped together into bandwidth groups, a bandwidth limit can be assigned to each bandwidth group based on its priority. For example, a bandwidth group associated with higher priority tasks like writing application data can be assigned a higher bandwidth limit, and thus more of the total available bandwidth, than another bandwidth group associated with lower priority tasks like writing logging data.

Figure 2:
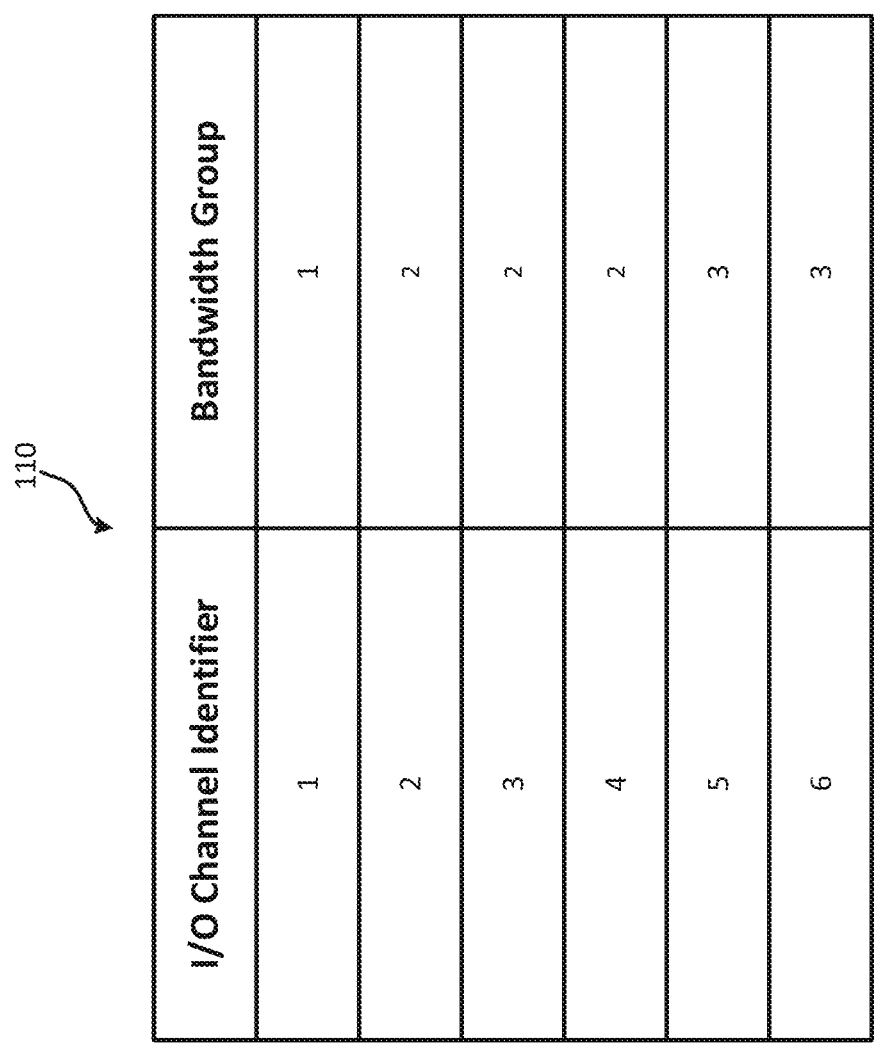
FIG. 2 is a table of an example of a bandwidth group mapping according to some aspects of the present disclosure.

The bandwidth group assignments can be stored in a bandwidth group mapping 110. One example of such a bandwidth group mapping 110 is shown in FIG. 2. As shown, the bandwidth group mapping 110 can be a table that correlates I/O channels to bandwidth groups, though other data structures besides tables are also possible. In particular, the I/O channels are each assigned a unique identifier that uniquely identifies the I/O channel from other I/O channels in the table. These unique identifiers can be referred to herein as I/O channel identifiers. Examples of an I/O channel identifier can include a file descriptor (e.g., on a Linux operating system) or a file handle (e.g., on a Windows operating system). The I/O channel identifiers can be correlated, in the bandwidth group mapping 110, to various bandwidth groups.

As noted above, a bandwidth limit can also be assigned to each bandwidth group. For example, a bandwidth limit of 100 kilobytes (kB) may be assigned to the bandwidth group 132a and a bandwidth limit of 1 megabytes (MB) may be assigned to the bandwidth group 132b. The bandwidth limits can be selected and assigned to bandwidth groups by the user 130. Thus, the bandwidth limits may be user customizable. In some examples, the user 130 may assign a bandwidth limit to a particular bandwidth group 132b before the corresponding software applications 104b-c begin transmitting communications via the I/O channels 116e-f assigned to the bandwidth group 132b.

The bandwidth limit assignments can be stored in a bandwidth limit mapping 112. One example of such a bandwidth limit mapping 112 is shown in FIG. 3. As shown, the bandwidth groups can be correlated, in the bandwidth limit mapping 112, to various bandwidth limits. It is possible for multiple bandwidth groups to be assigned the same bandwidth limit or to be assigned different bandwidth limits.

Additionally, I/O control policies 124 can be assigned to the I/O channels 116a-f. An I/O control policy is a policy specifying how I/O requests associated with an I/O channel are to be handled when the bandwidth limit assigned to a bandwidth group containing the I/O channel is exceeded. An I/O control policy may be stored in a file or another data structure. The I/O control policy can include commands or instructions for implementing a particular technique for handling the I/O requests associated with the I/O channel. I/O control policies 124 may be created on the computing device 102 by a user or downloaded to the computing device 102. Different I/O control policies may be configured to implement the same technique or different techniques for handling the I/O requests. For example, a first policy 122a may be assigned to the I/O channel 116a, and a second policy 122b may be assigned to the I/O channel 116b. The first policy 122a may be configured for causing an I/O request to be discarded when the bandwidth limit for the bandwidth group 132a is exceeded. The second policy 122b may be configured for causing an I/O request to be delayed for a time interval (e.g., 5 milliseconds) when the bandwidth limit for the bandwidth group 132a is exceeded. The length of the time interval may depend on various factors, such as the size of the I/O request and the available bandwidth. Of course, other I/O request handling techniques are also possible. There can be any number and combination of I/O control policies 124 for implementing any number and combination of bandwidth control techniques.

Figure 4:
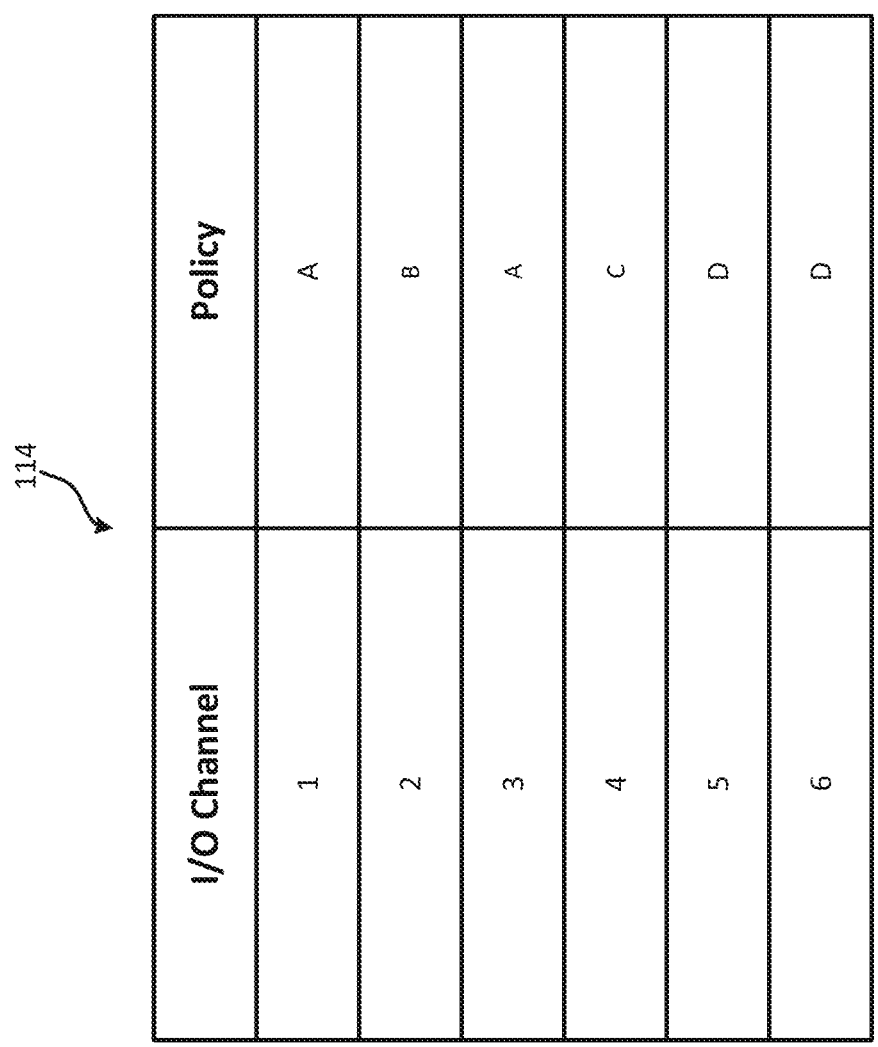
FIG. 4 is a table of an example of a policy mapping according to some aspects of the present disclosure.

The I/O control policy assignments can be stored in a policy mapping 114. One example of such a policy mapping 114 is shown in FIG. 4. As shown, the I/O channels can be correlated, in the bandwidth limit mapping 112, to various I/O control policies. It is possible for multiple I/O channels to be assigned the same I/O control policy or to be assigned different I/O control policies.

In some examples, the I/O control policies 124 can be assigned to the I/O channels 116a-f by the software applications 104a-c, by a software framework, by a user of the computing device 102, or by another entity. For example, a software application 104a can select an I/O control policy for a particular I/O channel used by the software application 104a. The software application 104a can then transmit a command 108 to a software framework or another component of the computing device 102 indicating that the I/O control policy 122a is to be assigned to the I/O channel 116a. The command 108 can be transmitted during or after a startup phase of the software application 104a. In response to the command 108, the requested I/O control policy 122a can be assigned to the particular I/O channel 116a.

The software applications 104a-c may determine which of the I/O control policies 124 to assign to a particular I/O channel using any suitable technique. For example, a software developer may preprogram logic into the software application 104a for determining that information. The software application 104a can then determine which of the I/O control policies 124 to assign to which I/O channels 116a-c based on its internal logic. Alternatively, a user (e.g., user 130) can specify that information in a configuration file for the software application 104a. The software application 104a can then determine which of the I/O control policies 124 to assign to which I/O channels 116a-c based on the configuration file. Other techniques are also possible.

As shown in FIG. 1, the computing device 102 can also include a bandwidth management service 106. The bandwidth management service 106 is software that is separate from the software applications 104a-c. The bandwidth management service 106 may be configured to intercept I/O requests from the software applications 104a-c and perform one or more control operations based on the I/O requests. In some examples, the bandwidth management service 106 may be part of an operating system (e.g., Red Hat Enterprise Linux®, Apple MacOX®, or Microsoft Windows®) of the computing device 102. For example, the bandwidth management service 106 may be part of the kernel of the operating system. Alternatively, the bandwidth management service 106 may be another type of software, such as a system runtime library running on the computing device 102.

Once the above aspects of the system are configured, the bandwidth management service 106 can implement a bandwidth monitoring and control service. For example, the bandwidth management service 106 can detect an I/O request 128 from a software application 104a. This detection may be achieved via the insertion of a hook, for example an event hook that can be triggered in response to an I/O event such as an I/O request. In some examples, the I/O request may be a write request for writing data, such as log data, to a storage system. The storage system may be a local storage system 134 or a remote storage system 126. The local storage system 134 can be a storage system that is internal to the computing device 102 or accessible to the computing device 102 via a local area network. The remote storage system 126 can be a storage system that is accessible to the computing device 102 via one or more networks 120 such as the Internet. In response to detecting the I/O request 128, the bandwidth management service 106 can determine whether the I/O channel 116b is part of a bandwidth group. In some examples, the bandwidth management service 106 may make this determination by consulting the bandwidth group mapping 110. In the example shown in FIG. 1, the I/O channel 116b is part of the bandwidth group 132a. So, the bandwidth management service 106 can determine that the I/O channel 116b is part of the bandwidth group 132a.

Having determined that the I/O channel 116b is part of the bandwidth group 132a, the bandwidth management service 106 can next determine the bandwidth consumption of the bandwidth group 132a. The bandwidth consumption of a bandwidth group is the total amount of bandwidth consumption associated with all of the I/O channels in the bandwidth group during a predefined time interval. The predefined time interval can be a predefined time window, which can be designated as W. For example, the bandwidth consumption of the bandwidth group 132a can be the total amount of bandwidth consumed in relation to all of the I/O requests transmitted on all of the I/O channels 116a-b in the bandwidth group 132a during the predefined time interval W. The predefined time interval W may be customizable by a user, such as user 130.

The bandwidth consumption of a bandwidth group can be computed by adding together the individual bandwidth consumption associated with each individual I/O channel in the bandwidth group during the predefined time interval W. For example, the software application 104a can transmit multiple write requests for writing data via the I/O channels 116a-b during the predefined time interval W, which may be for example a 5 millisecond time interval. The write requests and the associated data can consume bandwidth on those I/O channels 116a-b. The bandwidth management service 106 can compute the bandwidth consumption associated with bandwidth group 132a during the time interval W by adding together the bandwidth consumed by all of the write requests on all of the I/O channels 116a-b during the predefined time interval W. In this way, the bandwidth management service 106 can monitor and track (e.g., in real time) the total bandwidth consumption associated with each bandwidth group during a given time interval W.

Before or after determining the bandwidth consumption associated with the bandwidth group 132a, the bandwidth management service 106 can determine a bandwidth limit assigned to the bandwidth group 132a. The bandwidth limit can be the maximum allowed I/O volume (Vmax) during the predefined time interval W. The value of Vmax may also be customizable by a user, such as the user 130. In some examples, the bandwidth management service 106 may determine the bandwidth limit by consulting the bandwidth limit mapping 112.

Having determined the bandwidth limit, the bandwidth management service 106 can compare the bandwidth consumption associated with the bandwidth group 132 to the bandwidth limit to determine whether the bandwidth consumption meets or exceeds the bandwidth limit. If the bandwidth management service 106 determines that the bandwidth consumption associated with the bandwidth group 132 is below the bandwidth limit, the bandwidth management service 106 may allow the I/O request 128 to be performed (e.g., as normal without executing any of the I/O control policies 124). But if the bandwidth management service 106 determines that the bandwidth consumption meets or exceeds the bandwidth limit, the bandwidth management service 106 can determine which of the I/O control policies 124 to execute, for example by consulting the policy mapping 114. The bandwidth management service 106 can then execute whichever I/O control policy 122a is assigned to the I/O channel 116b. Executing the I/O control policy 122a may involve executing program code or commands specified in the I/O control policy 122a. In some examples, the I/O control policy 122a can be configured to avoid overconsumption of bandwidth. For example, the I/O control policy 122a may be configured for causing the I/O request 128 to be discarded. Alternatively, the I/O control policy 122a may be configured for causing the I/O request 128 to be delayed for a particular time period (e.g., until after the next time interval W begins).

As another example of the bandwidth monitoring and control service, the bandwidth management service 106 can detect an I/O request 118 on an I/O channel 116c from a software application 104a. The I/O request may be a write request for writing data to the storage system or a read request for reading data from a storage system. The storage system can include one or more memory devices, such as a hard drive, random access memory, cache memory, or any combination of these, from which the data can be read or to which the data can be written. In response to detecting the I/O request 118, the bandwidth management service 106 can determine whether the I/O channel 116c is part of a bandwidth group. If the bandwidth management service 106 determines that the I/O channel 116c is not part of a bandwidth group, as is the case in the example shown in FIG. 1, then the bandwidth management service 106 can allow the I/O request 118 to be performed without executing any of the I/O control policies 124.

Although FIG. 1 shows a particular number and arrangement of components, this is for illustrative purposes and intended to be non-limiting. Other examples may involve more components, fewer components, different components, or a different arrangement of the components than is shown in FIG. 1. For instance, although the mappings 110-114 are shown as separate from each other in FIG. 1, in other examples some or all of these mappings may be combined together into a single table or database.

Figure 5:
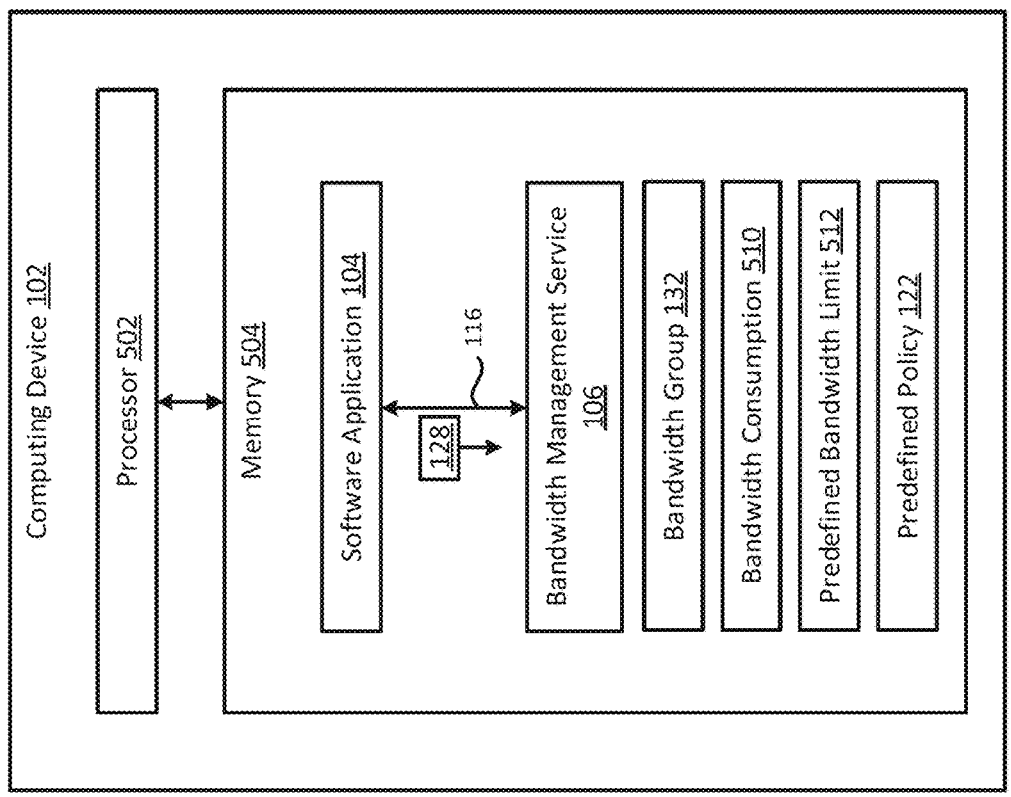
FIG. 5 is a block diagram of an example of a computing device for controlling bandwidth consumption according to some aspects of the present disclosure.

FIG. 5 is a block diagram of an example of a computing device 102 for controlling bandwidth consumption according to some aspects of the present disclosure. The computing device 102 can include a processor 502 communicatively coupled to a memory 504.

The processor 502 is hardware that can include one processing device or multiple processing devices. Non-limiting examples of the processor 502 include a Field-Programmable Gate Array (FPGA), an application-specific integrated circuit (ASIC), or a microprocessor. The processor 502 can execute instructions stored in the memory 504 to perform computing operations. In some examples, the instructions may correspond to a software application 104*a*, the bandwidth management service 106, or both. The instructions may include processor-specific instructions generated by a compiler or an interpreter from code written in any suitable computer-programming language, such as C, C++, C#, Python, or Java.

The memory 504 can include one memory device or multiple memory devices. The memory 504 can be volatile or can be non-volatile, such that it can retain stored information when powered off. Some examples of the memory 504 can include electrically erasable and programmable read-only memory (EEPROM), flash memory, or any other type of non-volatile memory. At least some of the memory 504 includes a non-transitory computer-readable medium from which the processor 502 can read instructions. A computer-readable medium can include electronic, optical, magnetic, or other storage devices capable of providing the processor 502 with computer-readable instructions or other program code. Some examples of a computer-readable medium include magnetic disks, memory chips, ROM, random-access memory (RAM), an ASIC, a configured processor, optical storage, or any other medium from which a computer processor can read the instructions.

In some examples, the processor 502 can execute the bandwidth management service 106 to perform some or all of the functionality described herein. For example, the processor 502 can detect (e.g., receive) an I/O request 128 transmitted by the software application 104. In response to detecting the I/O request 128, the processor 502 can determine an I/O channel 116 associated with the I/O request 128. The processor 502 can also determine whether a bandwidth group 132 corresponds to the I/O channel 116. In response to determining that a bandwidth group 132 corresponds to the I/O channel 116, the processor 502 can determine whether bandwidth consumption 510 of the bandwidth group 132 exceeds a predefined bandwidth limit 512 assigned to the bandwidth group 132. In response to determining that the bandwidth consumption 510 of the bandwidth group 132 exceeds the predefined bandwidth limit 512, the processor 502 can execute a predefined policy 122 assigned to the I/O channel 116. The predefined policy 122 is an I/O control policy that may be configured for preventing the I/O request 128 from being performed for at least a particular time period.

Figure 6:
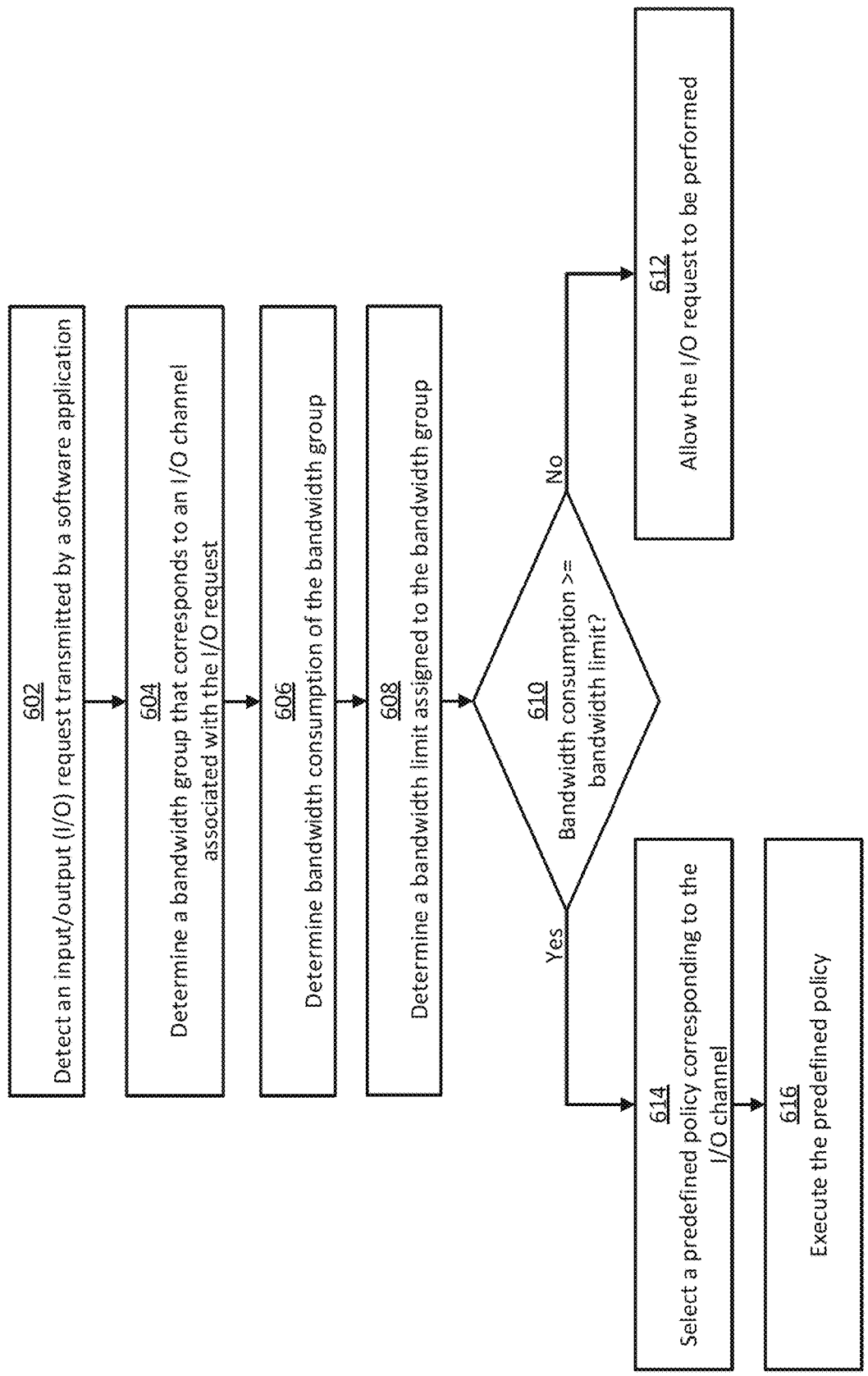
FIG. 6 is a flow chart of an example of a process for controlling bandwidth consumption according to some aspects of the present disclosure.

In some examples, the processor 502 can execute the bandwidth management service 106 to perform some or all of the steps shown in FIG. 6. Although FIG. 6 shows a certain number and arrangement of steps, this is for illustrative purposes and not intended to be limiting. Other examples may involve more steps, fewer steps, different steps, or a different order of the steps than are shown in FIG. 6. The steps of FIG. 6 will now be described below with reference to the components of FIG. 5 described above.

In block 602, the processor 502 detects an I/O request 128 transmitted by a software application 104. For example, the processor 502 can monitor the system for I/O events, which may trigger a hook. As another example, the processor 502 can monitor the I/O channel 116 for I/O requests to detect new I/O requests on the I/O channel 116. As another example, the software application 104 can notify the processor 502 of the I/O request via a function call or another call.

In some examples, the I/O request 128 may include an I/O channel identifier (ID) that uniquely identifies the I/O channel 116 associated with the I/O request 128. Examples of the I/O channel identifier can include a file descriptor or a file handle. The processor 502 can extract the I/O channel ID from the I/O request 128 to determine the I/O channel 116 associated with the I/O request.

In block 604, the processor 502 determines a bandwidth group 132 that corresponds to an I/O channel 116 associated with the I/O request 128. The processor 502 can make this determination based on a mapping, such as the bandwidth group mapping 110 of FIG. 1. For example, the processor 502 may first determine whether the I/O channel 116 is assigned to any bandwidth group at all. To do so, the processor 502 may first access the mapping to determine whether the I/O channel 116 is listed in the mapping. If the I/O channel 116 is listed in the mapping, it may mean that there is indeed a bandwidth group assigned to the I/O channel 116. So, the processor 502 can consult the mapping to determine which bandwidth group 132 is assigned to the I/O channel 116.

In block 606, the processor 502 determines bandwidth consumption 510 of the bandwidth group 132. For example, the processor 502 can monitor the I/O channels in the bandwidth group 132, for example to detect the I/O requests transmitted via the I/O channels in the bandwidth group 132. Based on these I/O requests, the processor 502 can track the bandwidth consumption of the bandwidth group 132 during a predefined time interval. This monitoring and tracking may be performed substantially continuously and in real time. The processor 502 can also perform similar monitoring and tracking for some or all of the other bandwidth groups.

In block 608, the processor 502 determines a bandwidth limit assigned to the bandwidth group 132. In some examples, the bandwidth limit can be a predefined bandwidth limit 512 stored in a mapping, such as the bandwidth limit mapping 112 of FIG. 1. The processor 502 can consult the mapping to determine which bandwidth limit is assigned to the bandwidth group 132. In other examples, the bandwidth limit can be determined on-the-fly using an algorithm or other means.

In block 610, the processor 502 determines whether the bandwidth consumption 510 is greater than or equal to the bandwidth limit. If not, the process can proceed to block 612 where the processor 502 can allow the I/O request 128 to be performed (e.g., without executing a corresponding I/O control policy). This may involve transmitting the I/O request 128 to its intended destination. If the processor 502 determines that the bandwidth consumption 510 is greater than or equal to the bandwidth limit, then the process can proceed to block 614.

In block 614, the processor 502 selects a predefined policy 122 corresponding to the I/O channel 116. The predefined policy 122 is an I/O control policy that can be selected from among a group of possible I/O control policies. In some examples, the processor 502 can select the predefined policy 122 using a mapping, such as the policy mapping 114 of FIG. 1. The processor 502 can consult the mapping to determine which predefined policy 122 is assigned to the I/O channel 116. In other examples, the predefined policy 122 can be determined on-the-fly using an algorithm or other means.

In block 616, the processor 502 executes the predefined policy 122. This may involve performing an operation, or a sequence of operations, specified in the predefined policy 122. The processor 502 can execute the predefined policy 122 prior to the I/O request 128 being transmitted to its intended destination. This may allow for bandwidth controls to be implemented as far upstream as possible, for example before the data associated with the I/O request leaves application memory.

In some examples, the predefined policy 122 can be configured for causing the I/O request 128 to be discarded altogether. In other examples, the predefined policy 122 can be configured for causing the I/O request 128 to be delayed for a particular time period. For instance, the predefined policy 122 can configured for causing the I/O request 128 to be delayed for 3 milliseconds before the I/O request 128 is transmitted to its intended destination. In still other examples, the predefined policy 122 may be configured to implement other bandwidth control techniques.

Figure 7:
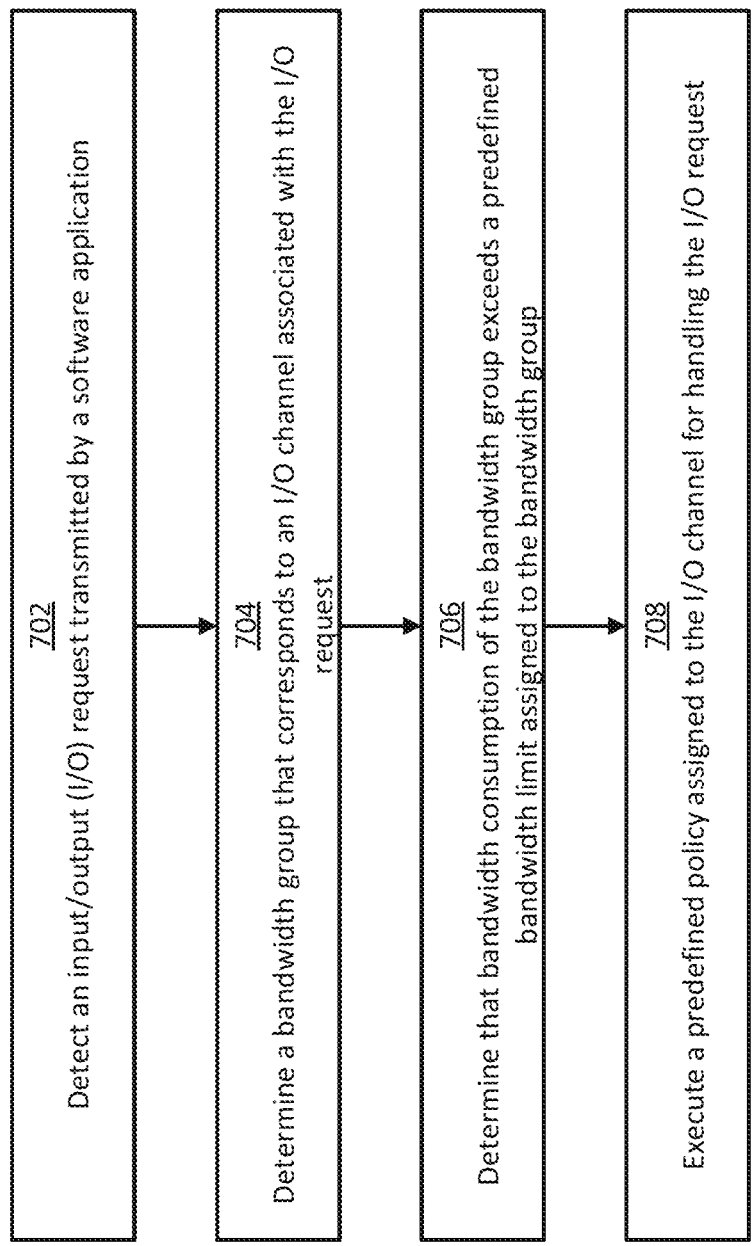
FIG. 7 is a flow chart of another example of a process for controlling bandwidth consumption when bandwidth consumption exceeds a predefined bandwidth limit according to some aspects of the present disclosure.

Referring now to FIG. 7, FIG. 7 is a flow chart of another example of a process for controlling bandwidth consumption according to some aspects of the present disclosure. Although FIG. 7 shows a certain number and arrangement of steps, this is for illustrative purposes and not intended to be limiting. Other examples may involve more steps, fewer steps, different steps, or a different order of the steps than are shown in FIG. 7. The steps of FIG. 7 will now be described below with reference to the components of FIG. 5 described above.

In block 702, the processor 502 detects an I/O request 128 transmitted by a software application 104. In some examples, the processor 502 can make this detection as described above with respect to block 602 of FIG. 6.

In block 704, the processor 502 determines a bandwidth group 132 that corresponds to an I/O channel 116 associated with the I/O request 128. In some examples, the processor 502 can make this determination as described above with respect to block 604 of FIG. 6.

In block 706, the processor 502 determines that the bandwidth consumption 510 of the bandwidth group 132 exceeds a predefined bandwidth limit 512 that is assigned to the bandwidth group 132. In some examples, the processor 502 can make this determination as described above with respect to blocks 606-610 of FIG. 6.

In block 708, the processor 502 executes a predefined policy 122 for handling the I/O request 128, where the predefined policy 122 is assigned to the I/O channel. In some examples, the processor 502 can perform this execution as described above with respect to blocks 616 of FIG. 6.

Figure 8:
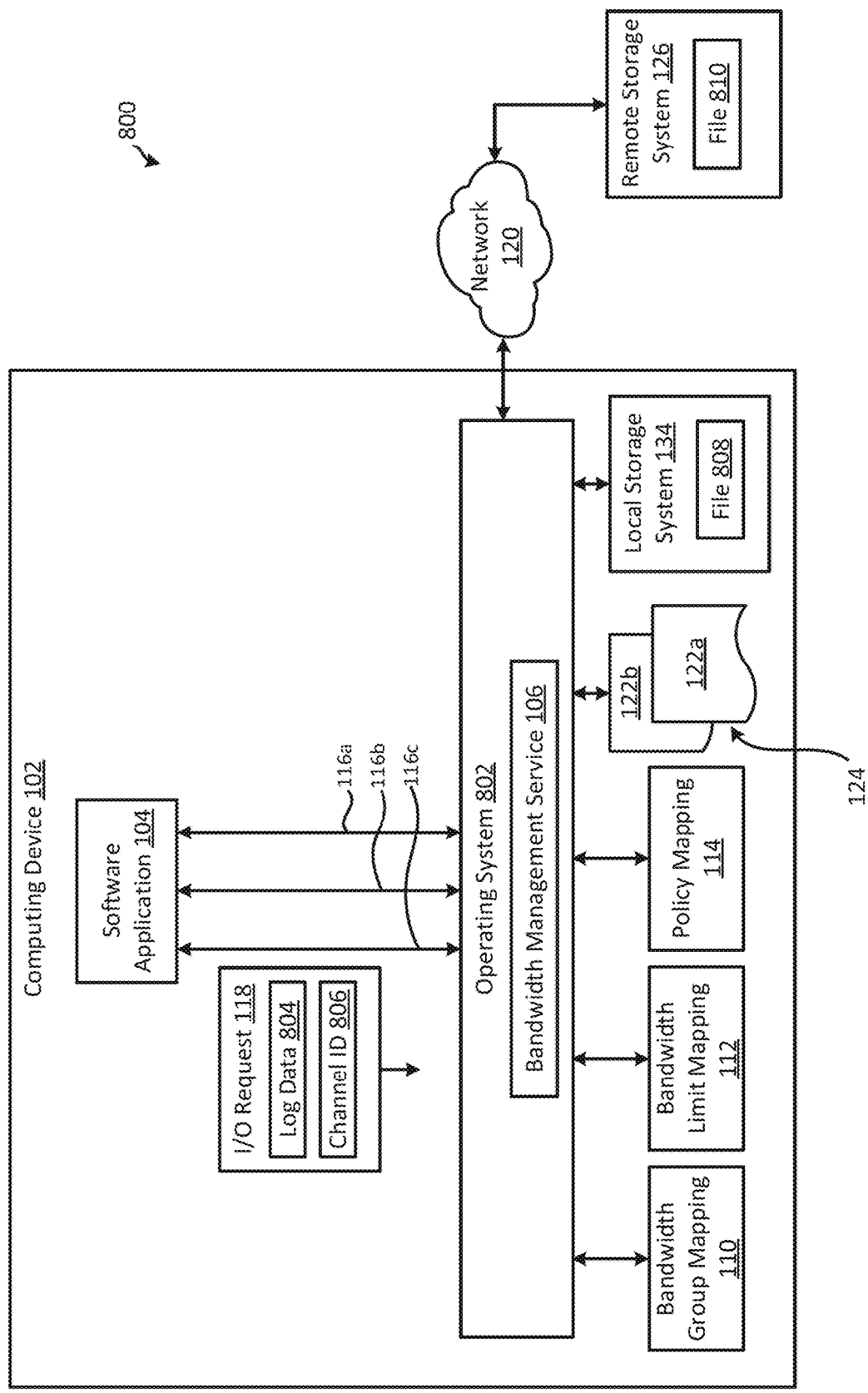
FIG. 8 is a block diagram of an example of a system for which an operating system is usable to control bandwidth consumption according to some aspects of the present disclosure.

FIG. 8 is a block diagram of an example of a system 800 for which an operating system 802 is usable to control bandwidth consumption according to some aspects of the present disclosure. This example can be similar to the example shown in FIG. 1, except the bandwidth management service 106 is part of the operating system 802 of the computing device 102. For instance, the bandwidth management service 106 can be implemented by a kernel of the operating system 802 or by another component of the operating system 802. Thus, the operating system 802 can be executed by a processor to perform some or all of the functionality described above with respect to the bandwidth management service 106.

For example, the operating system 802 can detect I/O requests associated with one or more I/O channels 116a-c. In the example shown in FIG. 8, the software application 104 has transmitted an I/O request 118 that is a write request for writing data to a file. The data may be log data 804 and the file may be a log file. In some examples, the file can be a local file 808 that is internal to the computing device 102 or accessible to the computing device 102 via a local area network. Alternatively, the file can be a remote file 810 that is accessible to the computing device 102 via one or more networks 120 such as the Internet.

The operating system 802 can detect the I/O request 118 and responsively determine an I/O channel 116c corresponding to the I/O request 118. For example, the operating system 802 can monitor the I/O channels 116a-c for I/O requests. Upon detecting the I/O request 118 on the I/O channel 116c, the operating system 802 can determine that the I/O channel 116c is associated with the I/O request 118. Alternatively, the operating system 802 can extract an I/O channel identifier 806 from the I/O request 118. Examples of the I/O channel identifier 806 can include a file descriptor or a file handle. The I/O channel identifier 806 can indicate which I/O channel 116c is to be used to communicate the I/O request 118. Based on the I/O channel identifier 806, the operating system 802 can determine that the I/O channel 116c is associated with the I/O request 118.

Next, the operating system 802 can determine a bandwidth group that corresponds to the I/O channel 116c, for example by using the bandwidth group mapping 110. The operating system 802 can also determine a predefined bandwidth limit assigned to the bandwidth group, for example by using the bandwidth limit mapping 112. The operating system 802 can then compare the bandwidth consumption of the bandwidth group to the predefined bandwidth limit to determine whether the bandwidth consumption meets or exceeds the predefined bandwidth limit. If so, the operating system 802 can execute a predefined I/O control policy, such as the second policy 122b, for handling the I/O request. The predefined I/O control policy can be selected for execution based on a prior assignment of the I/O control policy to the I/O channel 116c. On the other hand, if the bandwidth consumption is less than the predefined bandwidth limit, the operating system 802 may not execute the I/O control policy, which can allow the I/O request 118 to proceed as normal.

Although FIG. 8 shows a particular number and arrangement of components, this is for illustrative purposes and intended to be non-limiting. Other examples may involve more components, fewer components, different components, or a different arrangement of the components than is shown in FIG. 8. For instance, although the mappings 110-114 are shown as separate from each other in FIG. 8, in other examples some or all of these mappings may be combined together into a single table or database.

In some aspects, bandwidth control for I/O channels can be implemented according to one or more of the following examples. As used below, any reference to a series of examples is to be understood as a reference to each of those examples disjunctively (e.g., "Examples 1-4" is to be understood as "Examples 1, 2, 3, or 4").

Example #1: A non-transitory computer-readable medium comprising program code that is executable by a processor for causing the processor to perform operations including: detecting an input/output (I/O) request from a software application; in response to detecting the I/O request, determining a bandwidth group that corresponds to an I/O channel associated with the I/O request; determining whether bandwidth consumption of the bandwidth group exceeds a predefined bandwidth limit; and in response to determining that the bandwidth consumption of the bandwidth group exceeds the predefined bandwidth limit, executing a predefined policy assigned to the I/O channel for handling the I/O request.

Example #2: The non-transitory computer-readable medium of Example #1, further comprising program code that is executable by the processor for causing the processor to: determine the bandwidth group by selecting the bandwidth group from among a plurality of bandwidth groups based on the I/O channel, wherein each respective bandwidth group of the plurality of bandwidth groups encompasses one or more corresponding I/O channels; and based on selecting the bandwidth group, determine the predefined bandwidth limit that is assigned to the bandwidth group, wherein each respective bandwidth group of the plurality of bandwidth groups is assigned a respective bandwidth limit.

Example #3: The non-transitory computer-readable medium of Example #2, further comprising program code that is executable by the processor for causing the processor to: select the predefined policy from among a plurality of predefined policies based on the I/O channel, wherein each I/O channel in each respective bandwidth group of the plurality of bandwidth groups is assigned a respective predefined policy specifying how I/O requests from one or more software applications are to be handled when the respective bandwidth limit for the respective bandwidth group is exceeded.

Example #4: The non-transitory computer-readable medium of Example #3, wherein the plurality of predefined policies specify a plurality of different techniques for handling the I/O requests.

Example #5: The non-transitory computer-readable medium of any of Examples #1-4, further comprising program code that is executable by the processor for causing the processor to, prior to receiving the I/O request from the software application: receive a command from the software application; based on the command, select the predefined policy from among a plurality of predefined policies; and assign the predefined policy to the I/O channel.

Example #6: The non-transitory computer-readable medium of any of Examples #1-5, wherein the predefined policy is configured for causing the I/O request to be discarded, or wherein the predefined policy is configured for causing the I/O request to be delayed for a particular time period.

Example #7: The non-transitory computer-readable medium of any of Examples #1-6, further comprising program code that is executable by the processor for causing the processor to: in response to determining that the bandwidth consumption of the bandwidth group does not exceed the predefined bandwidth limit, allow the I/O request to be performed without executing the predefined policy in relation to the I/O request.

Example #8: The non-transitory computer-readable medium of any of Examples #1-7, wherein the predefined bandwidth limit is user customizable.

Example #9: The non-transitory computer-readable medium of any of Examples #1-8, wherein the I/O request is a write request for storing data output by the software application to a log file on a storage system, and wherein the I/O channel is an output channel for writing the data to the log file.

Example #10: The non-transitory computer-readable medium of any of Examples #1-9, wherein the program code corresponds to a kernel of an operating system, the kernel being configured to execute the operations.

Example #11: A method comprising detecting, by a processor, an input/output (I/O) request from a software application; in response to detecting the I/O request, determining, by the processor, a bandwidth group that corresponds to an I/O channel; in response to determining the bandwidth group, determining, by the processor, that bandwidth consumption of the bandwidth group exceeds a predefined bandwidth limit assigned to the bandwidth group; and in response to determining that the bandwidth consumption of the bandwidth group exceeds the predefined bandwidth limit, executing, by the processor, a predefined policy assigned to the I/O channel for handling the I/O request.

Example #12: The method of Example #11, further comprising: selecting, by the processor, the bandwidth group from among a plurality of bandwidth groups based on the I/O channel, wherein each respective bandwidth group of the plurality of bandwidth groups encompasses one or more corresponding I/O channels; and based on selecting the bandwidth group, determining, by the processor, the predefined bandwidth limit assigned to the bandwidth group, wherein each respective bandwidth group of the plurality of bandwidth groups is assigned a respective bandwidth limit.

Example #13: The method of Example #12, further comprising: selecting, by the processor, the predefined policy from among a plurality of predefined policies based on the I/O channel, wherein each I/O channel in each respective bandwidth group of the plurality of bandwidth groups is assigned a respective predefined policy specifying how I/O requests from one or more software applications are to be handled when the respective bandwidth limit for the respective bandwidth group is exceeded.

Example #14: The method of any of Examples #11-13, wherein the predefined policy is configured for causing the I/O request to be discarded.

Example #15: The method of any of Examples #11-14, wherein the predefined policy is configured for causing the I/O request to be delayed for a particular time period.

Example #16: A computing device comprising: a processor; and a non-transitory memory including: a software application; and a bandwidth management service that is separate from the software application, the bandwidth management service being executable by the processor to perform operations including: detecting an input/output (I/O) request from the software application; in response to detecting the I/O request, determining a bandwidth group that corresponds to an I/O channel associated with the I/O request; in response to determining the bandwidth group that corresponds to the I/O channel, determining whether bandwidth consumption of the bandwidth group exceeds a predefined bandwidth limit assigned to the bandwidth group; and in response to determining that the bandwidth consumption of the bandwidth group exceeds the predefined bandwidth limit, executing a predefined policy assigned to the I/O channel for preventing the I/O request from being performed for at least a particular time period.

Example #17: The computing device of Example #16, wherein the bandwidth management service is further configured to: determine the bandwidth group by selecting the bandwidth group from among a plurality of bandwidth groups based on the I/O channel, wherein each respective bandwidth group of the plurality of bandwidth groups encompasses a corresponding set of I/O channels, and wherein each respective bandwidth group of the plurality of bandwidth groups is assigned a respective bandwidth limit; and select the predefined policy from among a plurality of predefined policies based on the I/O channel, wherein each I/O channel in each respective bandwidth group of the plurality of bandwidth groups is assigned a respective predefined policy of the plurality of predefined policies, the respective predefined policy specifying how the bandwidth management service is to handle I/O requests from one or more software applications when the respective bandwidth limit for the respective bandwidth group is exceeded.

Example #18: The computing device of any of Examples #16-17, wherein the bandwidth group includes a plurality of I/O channels.

Example #19: The computing device of any of Examples #16-18, wherein the bandwidth management service is further configured to, prior to receiving the I/O request from the software application: receive a command; select, based on the command, the predefined policy from among a plurality of predefined policies; and assign the predefined policy to the I/O channel.

Example #20: The computing device of any of Examples #16-19, wherein the I/O request is a write request for writing data to a destination, and wherein the bandwidth management service is further configured to execute the predefined policy prior to the data being transferred out of application memory.

Example #21: A computing device comprising: a processor; and a memory including instructions for a software application and an operating system of the computing device, the operating system being executable by the processor to perform operations including: detecting an I/O request from the software application, wherein the I/O request is for writing log data to a storage device or reading the log data from the storage device; in response to detecting the I/O request, extracting an I/O channel identifier from the I/O request; determine a bandwidth group associated with the I/O channel identifier; in response to determining the bandwidth group, determining whether bandwidth consumption of the bandwidth group exceeds a predefined bandwidth limit assigned to the bandwidth group; and in response to determining that the bandwidth consumption of the bandwidth group exceeds the predefined bandwidth limit, executing a predefined policy assigned to the I/O channel for handling the I/O request.

Example #22: The computing device of Example #21, wherein the operating system is further configured to: select the predefined bandwidth limit based on the bandwidth group; and select the predefined policy based on the I/O channel.

Example #23: The computing device of Example #22, wherein the operating system is configured to select the predefined bandwidth limit based on the bandwidth group by accessing a predefined mapping that correlates predefined bandwidth limits to bandwidth groups.

Example #24: The computing device of any of Examples #22-23, wherein the operating system is configured to select the predefined policy based on the I/O channel by accessing a predefined mapping that correlates predefined policies to I/O channels.

Example #25: The computing device of any of Examples #21-24, wherein the operating system is further configured to determine the bandwidth group associated with the I/O channel identifier by accessing a predefined mapping that correlates I/O channel identifiers to bandwidth groups.

Example #26: The computing device of Examples #21-25, wherein the operating system is further configured to: select the bandwidth group from among a plurality of bandwidth groups based on the I/O channel identifier, wherein each respective bandwidth group of the plurality of bandwidth groups encompasses one or more corresponding I/O channels; and based on selecting the bandwidth group, determine the predefined bandwidth limit assigned to the bandwidth group, wherein each respective bandwidth group of the plurality of bandwidth groups is assigned a respective bandwidth limit.

Example #27: The computing device of Example #26, wherein the operating system is further configured to: select the predefined policy from among a plurality of predefined policies based on the I/O channel, wherein each I/O channel of each respective bandwidth group of the plurality of bandwidth groups is assigned a respective predefined policy specifying how I/O requests from one or more software applications are to be handled when the respective bandwidth limit for the respective bandwidth group is exceeded.

Example #28: The computing device of Examples #21-27, wherein the bandwidth group includes a plurality of I/O channel identifiers.

Example #29: The computing device of Examples #21-28, wherein the operating system is further configured to discard the I/O request based on the predefined policy.

Example #30: The computing device of Examples #21-29, wherein the operating system is further configured to delay the I/O request for a particular time period based on the predefined policy.

Example #31: The computing device of Examples #21-30, wherein the I/O channel identifier includes a file descriptor.

Example 32: A method comprising: detecting, by a processor, an I/O request from a software application, wherein the I/O request is for writing log data to a storage device or reading the log data from the storage device; in response to detecting the I/O request, extracting, by the processor, an I/O channel identifier from the I/O request; determining, by the processor, a bandwidth group that corresponds to the I/O channel identifier; in response to determining the bandwidth group, determining, by the processor, whether bandwidth consumption of the bandwidth group exceeds a predefined bandwidth limit assigned to the bandwidth group; and in response to determining that the bandwidth consumption of the bandwidth group exceeds the predefined bandwidth limit, executing, by the processor, a predefined policy assigned to the I/O channel for handling the I/O request.

Example #33: The method of Example #32, further comprising: selecting, by the processor, the predefined bandwidth limit based on the bandwidth group; and selecting, by the processor, the predefined policy based on the I/O channel.

Example #34: The method of Example #33, further comprising: selecting, by the processor, the predefined bandwidth limit based on the bandwidth group by accessing a predefined mapping that correlates predefined bandwidth limits to bandwidth groups.

Example #35: The method of any of Examples #33-34, further comprising: selecting, by the processor, the predefined policy based on the I/O channel by accessing a predefined mapping that correlates predefined policies to I/O channels.

Example #36: The method of any of Examples #32-35, further comprising: determining, by the processor, the bandwidth group associated with the I/O channel identifier by accessing a predefined mapping that correlates I/O channel identifiers to bandwidth groups.

Example #37: The method of any of Examples #32-36, further comprising: selecting, by the processor, the bandwidth group from among a plurality of bandwidth groups based on the I/O channel identifier, wherein each respective bandwidth group of the plurality of bandwidth groups encompasses one or more corresponding I/O channel identifiers associated with one or more I/O channels; and based on selecting the bandwidth group, determining, by the processor, the predefined bandwidth limit assigned to the bandwidth group, wherein each respective bandwidth group of the plurality of bandwidth groups is assigned a respective bandwidth limit.

Example #38: The method of Example #37, further comprising: selecting, by the processor, the predefined policy from among a plurality of predefined policies based on the I/O channel, wherein each I/O channel of each respective bandwidth group of the plurality of bandwidth groups is assigned a respective predefined policy specifying how I/O requests from one or more software applications are to be handled when the respective bandwidth limit for the respective bandwidth group is exceeded.

Example #39: The method of any of Examples #32-38, wherein the bandwidth group includes a plurality of I/O channel identifiers.

Example #40: The method of any of Examples #32-38, wherein the I/O channel identifier is a file descriptor.

Example #41: A system comprising: means for detecting an input/output (I/O) request from a software application; means for determining a bandwidth group that corresponds to an I/O channel associated with the I/O request, in response to detecting the I/O request; means for determining whether bandwidth consumption of the bandwidth group exceeds a predefined bandwidth limit assigned to the bandwidth group, in response to determining the bandwidth group; and means for executing a predefined policy assigned to the I/O channel for handling the I/O request, in response to determining that the bandwidth consumption of the bandwidth group exceeds the predefined bandwidth limit.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A non-transitory computer-readable medium comprising program code that is executable by a processor for causing the processor to perform operations including:
   detecting an input/output (I/O) request from a software application;
   in response to detecting the I/O request, determining a bandwidth group that corresponds to an I/O channel associated with the I/O request;
   determining whether bandwidth consumption of the bandwidth group exceeds a predefined bandwidth limit;
   selecting a predefined policy from among a plurality of predefined policies based on the predefined policy being assigned to the I/O channel; and
   in response to determining that the bandwidth consumption of the bandwidth group exceeds the predefined bandwidth limit, executing the predefined policy assigned to the I/O channel for handling the I/O request.

2. The non-transitory computer-readable medium of claim 1, further comprising program code that is executable by the processor for causing the processor to:
   determine the bandwidth group by selecting the bandwidth group from among a plurality of bandwidth groups based on the I/O channel, wherein each respective bandwidth group of the plurality of bandwidth groups encompasses one or more corresponding I/O channels; and
   based on selecting the bandwidth group, determine the predefined bandwidth limit that is assigned to the bandwidth group, wherein each respective bandwidth group of the plurality of bandwidth groups is assigned a respective bandwidth limit.

3. The non-transitory computer-readable medium of claim 2, wherein each I/O channel in each respective bandwidth group of the plurality of bandwidth groups is assigned a respective predefined policy specifying how I/O requests from one or more software applications are to be handled when the respective bandwidth limit for the respective bandwidth group is exceeded.

4. The non-transitory computer-readable medium of claim 3, wherein the plurality of predefined policies specify a plurality of different techniques for handling the I/O requests.

5. The non-transitory computer-readable medium of claim 1, further comprising program code that is executable by the processor for causing the processor to, prior to receiving the I/O request from the software application:
   receive a command from the software application;
   based on the command, select the predefined policy from among the plurality of predefined policies; and
   assign the predefined policy to the I/O channel.

6. The non-transitory computer-readable medium of claim 1, wherein the predefined policy is configured for causing the I/O request to be discarded, or wherein the predefined policy is configured for causing the I/O request to be delayed for a particular time period.

7. The non-transitory computer-readable medium of claim 1, further comprising program code that is executable by the processor for causing the processor to:
   in response to determining that the bandwidth consumption of the bandwidth group does not exceed the predefined bandwidth limit, allow the I/O request to be performed without executing the predefined policy in relation to the I/O request.

8. The non-transitory computer-readable medium of claim 1, wherein the predefined bandwidth limit is user customizable.

9. The non-transitory computer-readable medium of claim 1, wherein the I/O request is a write request for storing data output by the software application to a log file on a storage system, and wherein the I/O channel is an output channel for writing the data to the log file.

10. The non-transitory computer-readable medium of claim 1, wherein the program code corresponds to a kernel of an operating system, the kernel being configured to execute the operations.

11. A method comprising:
   detecting, by a processor, an input/output (I/O) request from a software application;
   in response to detecting the I/O request, determining, by the processor, a bandwidth group that corresponds to an I/O channel;
   in response to determining the bandwidth group, determining, by the processor, that bandwidth consumption of the bandwidth group exceeds a predefined bandwidth limit assigned to the bandwidth group;
   selecting, by the processor, a predefined policy from among a plurality of predefined policies based on the predefined policy being assigned to the I/O channel; and in response to determining that the bandwidth consumption of the bandwidth group exceeds the predefined bandwidth limit, executing, by the processor, the predefined policy assigned to the I/O channel for handling the I/O request.

12. The method of claim 11, further comprising:
   selecting, by the processor, the bandwidth group from among a plurality of bandwidth groups based on the I/O channel, wherein each respective bandwidth group of the plurality of bandwidth groups encompasses one or more corresponding I/O channels; and
   based on selecting the bandwidth group, determining, by the processor, the predefined bandwidth limit assigned to the bandwidth group, wherein each respective bandwidth group of the plurality of bandwidth groups is assigned a respective bandwidth limit.

13. The method of claim 12, wherein each I/O channel in each respective bandwidth group of the plurality of bandwidth groups is assigned a respective predefined policy specifying how I/O requests from one or more software applications are to be handled when the respective bandwidth limit for the respective bandwidth group is exceeded.

14. The method of claim 11, wherein the predefined policy is configured for causing the I/O request to be discarded.

15. The method of claim 11, wherein the predefined policy is configured for causing the I/O request to be delayed for a particular time period.

16. A computing device comprising:
   a processor; and
   a non-transitory memory including:
      a software application; and
      a bandwidth management service that is separate from the software application, the bandwidth management service being executable by the processor to perform operations including:
         detecting an input/output (I/O) request from the software application;
         in response to detecting the I/O request, determining a bandwidth group that corresponds to an I/O channel associated with the I/O request;
         in response to determining the bandwidth group that corresponds to the I/O channel, determining whether bandwidth consumption of the bandwidth group exceeds a predefined bandwidth limit assigned to the bandwidth group;
         selecting a predefined policy from among a plurality of predefined policies based on the predefined policy being assigned to the I/O channel; and
         in response to determining that the bandwidth consumption of the bandwidth group exceeds the predefined bandwidth limit, executing the predefined policy assigned to the I/O channel for preventing the I/O request from being performed for at least a particular time period.

17. The computing device of claim 16, wherein the bandwidth management service is further configured to:
   determine the bandwidth group by selecting the bandwidth group from among a plurality of bandwidth groups based on the I/O channel, wherein each respective bandwidth group of the plurality of bandwidth groups encompasses a corresponding set of I/O channels, and wherein each respective bandwidth group of the plurality of bandwidth groups is assigned a respective bandwidth limit; and
   wherein each I/O channel in each respective bandwidth group of the plurality of bandwidth groups is assigned a respective predefined policy of the plurality of predefined policies, the respective predefined policy specifying how the bandwidth management service is to handle I/O requests from one or more software applications when the respective bandwidth limit for the respective bandwidth group is exceeded.

18. The computing device of claim 16, wherein the bandwidth group includes a plurality of I/O channels.

19. The computing device of claim 16, wherein the bandwidth management service is further configured to, prior to receiving the I/O request from the software application:
   receive a command;
   select, based on the command, the predefined policy from among a plurality of predefined policies; and
   assign the predefined policy to the I/O channel.

20. The computing device of claim 16, wherein the I/O request is a write request for writing data to a destination, and wherein the bandwidth management service is further configured to execute the predefined policy prior to the data being transferred out of application memory.

* * * * *